United States Patent
De Lange et al.

(10) Patent No.: US 7,232,551 B1
(45) Date of Patent: Jun. 19, 2007

(54) FLUIDIZED BED METHOD AND REACTOR FOR THE TREATMENT OF CATALYSTS AND CATALYST CARRIERS

(75) Inventors: Paulus De Lange, Wesseling (DE); Hendrik Schönfelder, Mannheim (DE); Michael Kämmerer, Ludwigshafen (DE); Hans Werner Siebenhandl, Swisttal (DE); Kaspar Evertz, Schifferstadt (DE); Stefan Wietfeldt-Haltenhoff, Erftstadt (DE); Joachim Werther, Buchholz (DE)

(73) Assignee: Basell Polyolefine GmbH, Kehl (DE)

( * ) Notice: Subject to any disclaimer, the term of this patent is extended or adjusted under 35 U.S.C. 154(b) by 0 days.

(21) Appl. No.: 09/763,355

(22) PCT Filed: Oct. 15, 1999

(86) PCT No.: PCT/EP99/07837

§ 371 (c)(1),
(2), (4) Date: Feb. 21, 2001

(87) PCT Pub. No.: WO00/21655

PCT Pub. Date: Apr. 20, 2000

(30) Foreign Application Priority Data

Oct. 15, 1998 (DE) .................. 198 47 647

(51) Int. Cl.
*B01J 8/08* (2006.01)
*B01J 8/18* (2006.01)
(52) U.S. Cl. .............. 422/131; 422/139; 422/145; 526/104; 526/901
(58) Field of Classification Search ........ 526/901, 526/104, 105; 422/139, 145, 147, 131, 144, 422/138
See application file for complete search history.

(56) References Cited

U.S. PATENT DOCUMENTS

| 4,003,712 | A | * | 1/1977 | Miller .................... 422/62 |
| 4,038,038 | A |   | 7/1977 | Bunn, Jr. et al. ........... 23/288 |
| 4,197,418 | A |   | 4/1980 | Lee et al. ................ 585/469 |
| 4,229,608 | A |   | 10/1980 | Chen et al. .............. 585/640 |
| 4,251,484 | A | * | 2/1981 | Daviduk et al. .......... 422/145 |
| 4,518,750 | A |   | 5/1985 | Govoni et al. ............ 526/68 |
| 4,560,671 | A | * | 12/1985 | Gross et al. ............. 502/105 |
| 4,665,143 | A | * | 5/1987 | Ahluwalia et al. .......... 526/88 |
| 4,687,381 | A | * | 8/1987 | Dumain et al. ........... 406/52 |

(Continued)

FOREIGN PATENT DOCUMENTS

EP   0 101 893   3/1984

OTHER PUBLICATIONS

Diazo Kunii, Octave Levenspiel, "Fluidization Engineering", Butterworth-Heinemann (Stoneham), second edition (1991), p. 24.

*Primary Examiner*—Len Tran
(74) *Attorney, Agent, or Firm*—James C. Lydon

(57) ABSTRACT

A method for the treatment of catalysts or catalyst carriers by: a) introducing and distributing a gas in the lower section of a reactor containing a catalyst or catalyst carrier bulk material; b) forming a fluidized bed in the reactor; c) treating the particles in the fluidized bed while removing the fine particles an/or retaining the course particles by means of a separating organ and d) discharging the reactor. To this end, a reactor bottom which tapers downwards is used.

7 Claims, 2 Drawing Sheets

U.S. PATENT DOCUMENTS 4,740,551 A * 4/1988 Foster .......................... 525/52
5,034,364 A * 7/1991 Kral et al. ................... 502/117
5,266,276 A * 11/1993 Chinh et al. ................ 422/132
5,382,638 A * 1/1995 Bontemps et al. ............ 526/67
5,428,118 A * 6/1995 Painter et al. ................. 526/74
5,674,795 A * 10/1997 Wasserman et al. ........... 502/9
6,413,477 B1 * 7/2002 Govoni et al. .............. 422/131

* cited by examiner

FLUIDIZED BED METHOD AND REACTOR FOR THE TREATMENT OF CATALYSTS AND CATALYST CARRIERS

This application is a U.S. National Stage of International Application PCT/EP99/07837, filed on Oct. 15, 1999 and published on Apr. 20, 2000 in the German language.

The present invention relates to a fluidized bed method, to a reactor for the treatment of catalysts and catalyst carriers, and to the use of the method's products in the manufacture of polyolefins.

When gases flow from below through a bed of finely particulate material supported on perforated plates, a state similar to that of a boiling liquid becomes established under certain flow conditions—the bed throws up bubbles, and the particles of the bed material are in constant swirling up and down motion within the bed and thus remain suspended to a certain extent. In this connection, the term fluidized bed is used. Such a state arises when a certain limiting value for the velocity of the gas flowing through the bed from below against the gravity of the solid particles is reached. This point, at which the resting bed becomes a swirling bed, the fixed bed becomes a fluidized bed, is referred to as the whirl or fluidizing point. The reaching of this point depends on a number of physical factors; these are, for example, the density, size, distribution and shape of the particles and the properties of the fluidizing liquid.

Like a liquid, the fluidized bed can flow out through apertures, be conveyed through pipes or run off on inclined surfaces, for example a conveying channel. If the velocity of the fluidizing liquid is increased further, the bed expands to an ever greater extent, and bubbles form. Above a limiting velocity, the particles are discharged from the container as fluidized dust, but can be separated from the gas stream again in a downstream separator and fed to the reactor.

An advantageous separator is a so-called cyclone. In such a cyclone, the separation of the particles takes place with the aid of centrifugal force. In principle, cyclones consist of a cylindrical vessel with a conically narrowing base into which an inlet pipe for dust-containing air projects tangentially and an outlet pipe for clean air projects vertically. The gas/dust stream entering tangentially induces a whirl flow, with the relatively large dust particles being flung by the centrifugal force against the wall of the cylinder and from there sink to the base through the action of gravity, from where they can be discharged. The circulating, dust-freed gas whirl reverses its direction at the base of the cyclone and leaves the cyclone in an upward direction through the outlet pipe, possibly together with finer particles, since the separation principle is not sufficient to remove fine-dust contaminants completely. In industry, cyclones are predominantly employed for de-dusting.

Cyclones are an important component in many fluidized-bed processes. Fluidized-bed processes are used for a large number of industrial processes. The solid in the fluidized bed can act, for example, either as catalyst (fluidized-bed catalyst) or as heat-transfer agent, or can itself participate in the reaction. Important methods which can be designed as fluidized-bed methods are the following:

Gas-phase polymerization, coal combustion, coal liquefaction and Fischer-Tropsch synthesis, catalytic cracking of hydrocarbons, roasting of sulfidic ores, calcination of hydrated aluminia, calcination of limestone, desulfurization of gases, catalytic dehydrogenation of benzine-rich naphthene fractions, distillation of oil from bituminous sand, oxidation of naphthalene to phthalic anhydride on vanadium oxide, removal of fluorine in the recovery of phosphate, preparation of acrylonitrile, dichloroethane, $CCl_4$, $TiCl_4$, drying of brown coal and granular materials (for example comprising PVC, saltpeter, potassium salts, sawdust, sodium chloride, pigments, pharmaceutical preparations, insecticides, even microorganisms), aroma-retaining drying or roasting of foods (coffee beans, cocoa, groundnuts, cereal products, corn starch, rice, tea and many others), incineration of waste, garbage, special waste and sewage sludge, or physical processes, such as separation of small particles or mixing.

Fluidized-bed methods for the treatment of catalysts, initiators, catalyst carriers, initiator carriers and of carrier materials treated with initiators or catalysts will be considered below. Although strictly speaking a differentiation must be made in definition between initiators and catalysts, the term "catalysts" below is also taken to mean initiators (it is frequently only possible to tell with difficulty whether a reaction is initiated or catalyzed).

Correspondingly, carrier materials treated with active components—for example catalysts—are also referred to as catalysts below.

For treatment of catalyst carriers or catalysts (for example for use thereof in the polymerization of olefins), use is made of fluidized-bed methods in which the particles are moved by an upwardly directed gas stream with which they are in intense material and heat exchange. As time passes during the process, the particles are heated and undergo a physical/chemical change. When the conversion is complete, the particles are cooled and discharged from the reactor. In designing the reactors, particular attention is paid to the following:

A) gas distribution at the inlet
B) removal of fine particles from the gas stream leaving the reactor
C) discharge device Regarding A) (Gas Distribution)

The gas is distributed using flat, curved or inclined plates in the lower region of the reactor, the plates being provided with various types of passages for the gas. In the simplest case, these passages are holes, but can also be suitable inserts, for example bells or screws. For reliably uniform distribution of the gas, a gas distribution plate of this type requires a pressure loss of between at least 10 and 20 mbar. Advantageous distribution of the gas may be prevented by the passages for the gas being blocked by the particles.

In some beds, consisting of particles of certain materials and size, the phenomenon of channel formation is observed during introduction of gas into one of the reactors described. In this case, a fluidized bed is not formed, but instead the gas flows through the plate passages vertically upward through the bed. Even if the gas flow rate is increased, the particles then remain in the bed.

Distribution of the gas also plays a role in the treatment of particles with liquids sprayed into the fluidized bed. These liquids can function, for example, as binders for the particles, which thus aggregate and form relatively large agglomerates during drying.

Optimum distribution of the sprayed-in liquid by the fluidizing gas is crucial in avoiding firstly agglomeration of solid particles and secondly deposits forming on the reactor walls due to coating by solid [Daizo Kunii, Octave Levenspiel, "Fluidization Engineering", Butterworth-Heinemann (Stoneham), second edition (1991), p. 24].

Regarding B) (Separation)

At the reactor outlet, the gas is passed through a suitable separator, by means of which entrained particles are removed in order to keep them in the reactor. Such separators can be filter elements suspended directly in the reaction space. The disadvantage of these filter elements is that they become blocked and therefore must be cleaned or replaced regularly. It is advantageous to use a cyclone separator, which is essentially maintenance-free and, in contrast to a filter, has the ability to allow very fine particles to leave the reactor and reliably to retain relatively large particles. This property can have a positive effect on quality of the fluidized bed produced, since very fine particles are often undesired in later use. Microfine catalyst particles can, for example, cause so-called hot spots, which are undesired in later polymerizations.

Regarding C) (Discharge)

When the treatment is complete, the catalyst or catalyst carrier is discharged from the reactor via valves to be closed suitably. The openings are formed in the plate in order to minimize the amount of particles remaining in the reactor. The catalyst or catalyst carrier must necessarily pass through the passages of the gas distribution plate during the discharge process. The gas should be able to continue to flow through the plate in order to ensure the mobility of the particles (the latter do not automatically "slide" to the outlet, so it is necessary to use the fluidizing gas during discharging). However, the use of fluidizing gas during discharging hinders the advantageous use of a cyclone separator:

During discharging, the level of the fluidized bed drops to below the end of the outlet pipe of the cyclone, and, owing to the short-circuit gases consequently formed, the separation efficiency of the cyclone is greatly reduced, meaning that even relatively large particles are discharged from the reactor. This inevitably results in loss of material.

A further disadvantage is that the reactors described above cannot be emptied completely, since material always remains on the plates. The residues are passed through again together with fresh particles, giving material with a variety of residence times. This is generally of uneven, usually worse quality than material having a uniform residence time.

It is an object of the present invention to improve the above-described fluidized-bed method for the treatment of catalysts or catalyst carriers in such a way that channel formation does not occur, advantageous use of a cyclone is possible, and rapid and at least virtually complete, i.e. residue-free, discharging of the reactor takes place.

We have found that this object is achieved by a method for the treatment of catalysts or catalyst carriers by a) introducing and distributing gas in the lower section of a reactor containing a catalyst or catalyst carrier bulk material, b) forming a fluidized bed in the reactor, c) treating the catalyst or catalyst carrier particles in the fluidized bed, and d) discharging the reactor, using a reactor bottom tapering downwards.

In a preferred embodiment, relatively fine particles are removed and/or relatively large particles are retained by means of a separator.

In accordance with the invention, provision is also made for an apparatus for carrying out this latter process which comprises the following devices:

i) a reactor jacket having a reactor bottom tapering downwards, preferably conical, ii) a pipe for introducing gas into the reactor located beneath the reactor bottom and connected to a gas inlet pipe for gas introduction, iii) a device for discharging the reactor located beneath the reactor bottom, and iv) one or more separators.

The inventive solution, the provision of a reactor bottom tapering downwards for gas distribution in the basic fluidized-bed method, is presumably based on the fact that, surprisingly, the particles to be treated undergo virtually no damage or deactivation in the process. Downwardly tapering reactor bottoms are taken to mean those whose cross-sectional area reduces in a downward direction. In principle, symmetrical and asymmetrical shapes are possible. For example, a truncated pyramid, but in particular a truncated cone—i.e. a conical reactor bottom—is suitable. If these reactor bottoms tapering downwards are used, a layer located in the lower region of the bottom and surrounding the inside of the jacket is always present in addition to the fluidized bed. Exchange of material takes place in the layer, with particles of the fluidized bed entering the layer and on the other hand material leaving the layer due to "sliding off" of particles into the gas-introduction region and being fed back to the fluidized bed. Due to heat transfer from the reactor wall to the layer, undesirably high temperatures can occur in the latter. Possible consequences would be, for example, deactivation of the catalyst or sintering processes causing the formation of agglomerates and/or the blocking of the pores of the catalyst or catalyst carrier.

These disadvantages virtually do not occur, or do not occur at all, in the method according to the invention—possibly because the catalyst particles remain in the layer for only a very short time.

The layer acts advantageously in that it prevents channel formation (the constant sliding of particles off the jacket wall would immediately close each "channel"). In addition, the layer, owing to its conical structure, favors uniform distribution of the fluidizing gas.

Figure 1:
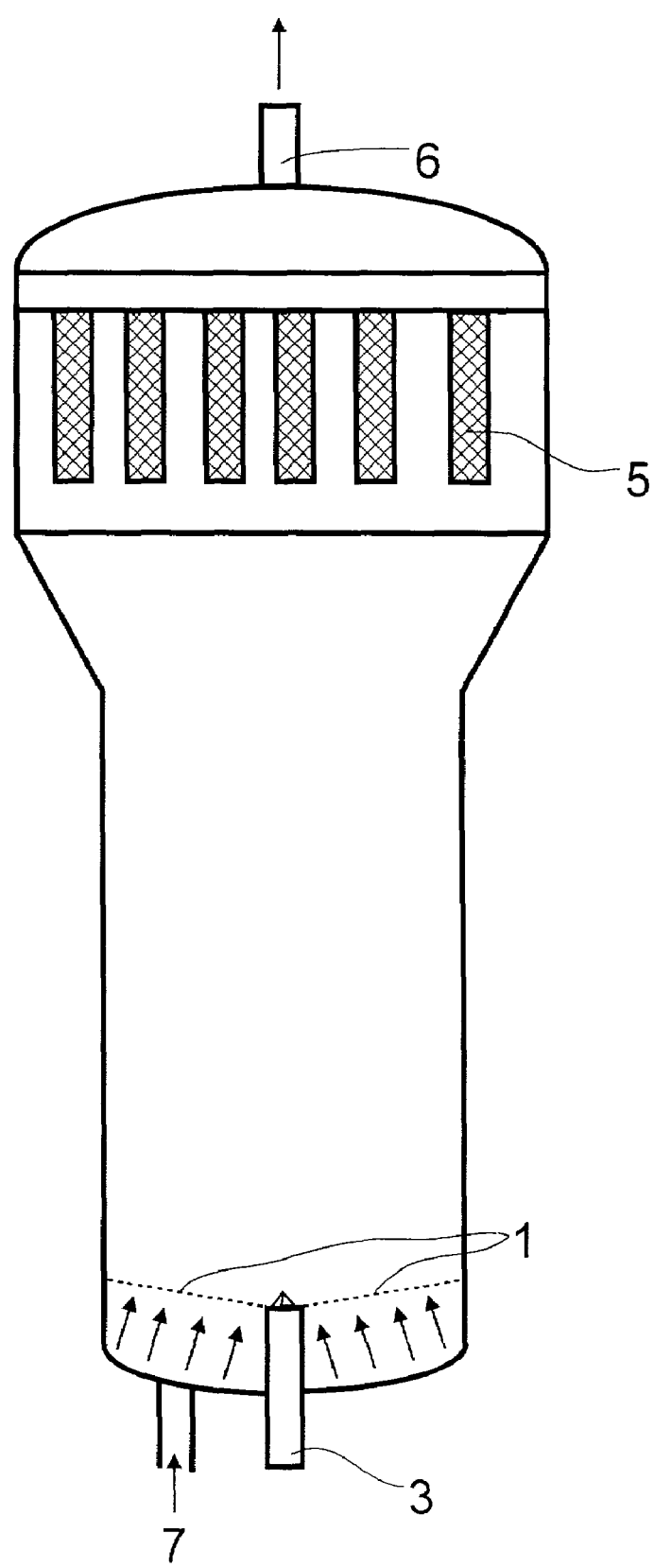
FIG. 1 is a reactor with distribution plate.
Figure 2:
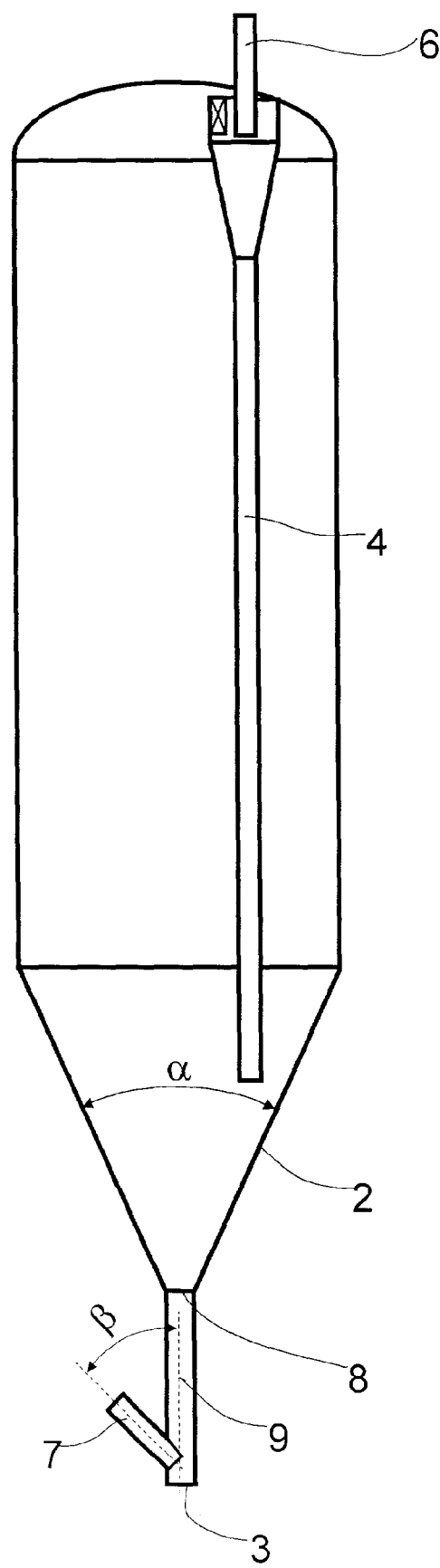
FIG. 2 is a reactor without distribution plate according to the present invention.

The attached drawing shows in FIG. 1 a gas distribution plate 1, a reactor discharging device 3, filter elements 5, a gas outlet 6, a gas inlet 7 and in FIG. 2 a reactor bottom 2, a reactor discharging device 3, a cyclone 4, a gas outlet 6, a gas inlet 7, a truncated cone 8, a pipe 9 for gas introduction into the reactor, a cone angle α and an angle β.

Since the reactor according to the invention (FIG. 2), in contrast to the reactor type usually used hitherto (FIG. 1), does not have a gas distribution plate 1, firstly the pressure loss which would be associated therewith does not occur, and secondly discharging of the reactor is simplified and is carried out without the use of fluidizing gas. The conical reactor bottom 2 enables catalyst or catalyst carrier to be removed from the reactor with greater efficiency, since the catalyst or catalyst carrier slides off the wall and all or virtually all reaches the discharge device 3 without leaving significant residues in the reactor. The reactor can thus be discharged residue-free or virtually residue-free (i.e. to the extent of at least 99%, preferably to the extent of at least 99.5%). It is advantageous for the conical reactor bottom 2 of the reactor to have a cone angle α, measured between the two internal jacket surfaces, of from 10° to 120°, preferably from 30° to 80°. The discharge device 3 (for example a pipe) is generally located at the lower end of the pipe 9 serving for gas introduction into the reactor. The pipe 9 thus partly also fulfills a function for discharging of the reactor. The discharging generally takes place significantly more quickly than in corresponding reactors having a gas distribution plate 1.

In order to remove entrained particles, the head of the reactor can have a cross-sectional widening. Additional separators can be installed in particular in the region of this widening.

A further essential advantage of the reactor according to the invention is that the separator used can advantageously be a cyclone 4, i.e. effective and reliable discharge of fine material is facilitated without having to accept material losses during discharging of the reactor. The disadvantages of the filter elements 5 employed in the processes usually used hitherto, which are located beneath the gas outlet 6, have been described in the introduction. The separator used in all cases serves to remove relatively fine particles and/or to retain relatively large particles.

Also of importance is the introduction of the carrier gas at the gas inlet 7. Since, as far as possible, no particles should enter the gas inlet 7 during charging and discharging, the corresponding inlet pipe should be inclined upward. The angle β measured between the gas inlet pipe of the gas inlet 7 and the upward verticals is, in particular, from 20° to 70°, preferably from 30° to 60°.

The catalysts or catalyst carrier treated in the process according to the invention are employed, in particular, in the polymerization of olefins, in which case the particles to be treated are generally fed to the reactor in the form of solid particles. Such polyolefin catalysts frequently contain doped carrier materials (for example based on silica gel). The active components used are, for example, transition metals, such as chromium or titanium. Examples of carrier materials are oxidic compounds, such as silica, alumina, silica-alumina, zirconia, thoria, fluorinated silica, fluorinated alumina, fluorinated silica-alumina, boron oxides or mixtures thereof. An additional surface modification of the carrier materials may be particularly advantageous. The treatment of the catalysts or catalyst carriers is generally a calcination and/or activation.

During the treatment, in addition to the carrier gas (fluidizing gas) introduced through the gas inlet 7, additional gases and, in addition to the originally introduced particles, additional solid can also be introduced into the fluidized bed. This introduction can take place at any time during the process and through feed points installed at any desired locations. Examples of suitable additional gases are oxygen, carbon dioxide or steam, while examples of additional solids which can be employed are ammonium hexafluorosilicate, untreated catalyst carriers or catalysts having a different physical/chemical structure. In addition, liquids, for example water, can be sprayed into the fluidized bed. Thus, liquids, additional solids and/or additional gases can also be introduced into the reactor.

The treatment by the method according to the invention is described in greater detail below with reference to working examples.

EXAMPLE 1 (CALCINATION)

25 kg of catalyst carrier having a bulk density of 450 kg/m$^3$ and a particle size distribution as shown in Table 1 were treated in a steel reactor having an overall height of 4 m, a diameter (cylindrical) of 0.3 m, a cone angle of 45° and an internal diameter of the pipe 9 installed on the truncated cone 8 of 25 mm. The reactor was heated from ambient temperature to 600° C. over the course of 6 hours, with $N_2$ being used as fluidizing gas. The reactor was subsequently held at this temperature for 10 hours and then cooled. The velocity, based on the empty pipe, in the cylindrical reactor part was between 4 cm/s and 8 cm/s. After the end of the process, the fluidizing gas was turned off and the catalyst support discharged. After the emptying process, about 0.05 kg of catalyst carrier (i.e. about 0.2%) remained in the reactor adhering to the wall as a dust coating.

TABLE 1

| Material properties of the silica gel ES70X ® | |
|---|---|
| Test | |
| Pore volume | 1.69 cc/g |
| Surface area | 320 m$^2$/g |
| Volatile content | 7.0% |
| Soda (as Na$_2$O) | 500 ppm |
| Bulk density | 300 g/l |

Particle size distribution of the silica gel ES70X ® (manufacturer Crosfield Catalysts) before and after calcination

| Material | Treatment | Median μm | <20.2 μm | <32 μm | >80.7 μm |
|---|---|---|---|---|---|
| ES70X ® (silicate with about 99.3% SiO$_2$ | untreated | 40.0 | 1.0 | 18.5 | 0.2 |
| | Heating for 10 h at 600° C. under N$_2$ | 40.5 | 1.1 | 19.1 | 0.1 |

(Measurement method: Coulter counter, pre-treatment: 30 sec ultrasound, electrolyte: 49.5% water, 49.5% glycerol, 1% NaCl, capillary: 560 μm, operating mode: manual)

EXAMPLE 2 (ACTIVATION)

200 kg of catalyst having a bulk density of 420 kg/m$^3$ and a particle size distribution as shown in Table 2 were activated in a steel reactor having an overall height of 5 m, a diameter (cylindrical) of 0.6 m, a cone angle of 45° and an internal diameter of the pipe 9 installed on the truncated cone 8 of 51 mm. The apparatus was heated from ambient temperature to 705° C. over the course of 10 hours, with air being used as fluidizing gas. The apparatus was subsequently held at this temperature for 10 hours and then cooled. During the cooling phase, the fluidizing gas was switched to nitrogen. The velocity, based on the empty pipe, in the cylindrical reactor part was 5 cm/s-10 cm/s. After the end of the process, the fluidizing gas was turned off and the catalyst discharged. After the emptying process, about 0.1 kg of catalyst (i.e. about 0.05%) remained in the reactor.

COMPARATIVE EXAMPLE C2 (ACTIVATION)

125 kg of catalyst of the type from Example 2 were activated in a reactor having an overall height of 5.5 m, a diameter of 0.6 m and a horizontal gas distribution plate with cylindrical holes (perforated plate). The apparatus was heated from ambient temperature to 705° C. over the course of 10 hours, with air being used as fluidizing gas. The apparatus was subsequently held at this temperature for 10 hours and then cooled. During the cooling phase, the fluidizing gas was switched to nitrogen. The velocity, based on the empty pipe, in the cylindrical reactor part was 5 cm/s-10 cm/s. After the end of the process, the catalyst was discharged via a centrally installed outlet pipe. After the emptying process, 5.2 kg (i.e. about 4%) remained on the distribution plate.

TABLE 2

Material properties off the catalyst Sylopol 969 IDW ®

| Test | Commercial product | After activation |
|---|---|---|
| Pore volume, cc/g | 1.24 | 1.24 |
| Surface area, m$^2$/g | 316 | not determined |
| Volatile content, % | 6.1 | not determined |
| Na$_2$O, % | 0.08 | not determined |
| Bulk density, g/l | not determined | 329 |

Particle size distribution of the catalyst Sylopol 969 IDW ® (manufacturer Grace GmbH) before and after activation

| Material | Treatment | Median μm | <20.2 μm | <32 μm | >80.7 μm |
|---|---|---|---|---|---|
| Sylopol 969 IDW ® (silicate with about 98% SiO$_2$ and about 1% Cr | untreated | 56.2 | 0.8 | 8.3 | 14.1 |
| | Heating for 10 h at 705° C. | 51.5 | 0.8 | 9.0 | 5.8 |

(Measurement method: Coulter counter, pretreatment: 30 sec ultrasound, electrolyte: 49.5% water, 49.5% glycerol, 1% NaCl, capillary: 560 μm, operating mode: manual).

We claim:

1. A method for activating and/or calcining olefin polymerization catalysts which contain transition materials as an active component or catalyst supports which contain oxidic compounds as a support material, said method comprising the steps of
   (a) introducing and distributing gas in the lower section of a reactor containing a layer of catalyst or catalyst support,
   (b) forming a fluidized bed in the reactor,
   (c) treating the catalyst or catalyst carrier particles in the fluidized bed wherein the treatment of the catalyst or catalyst support is selected from the group consisting of an activation treatment, a calcination treatment and both an activation treatment and a calcination treatment, and
   (d) discharging the reactor such that said reactor is substantially residue-free,
   wherein said reactor has a bottom which tapers downwards, and wherein said reactor has no gas distribution plate.

2. A method as claimed in claim 1, wherein in addition relatively fine particles are removed and/or relatively large particles are retained by means of a separator.

3. A method as claimed in claim 2, wherein said separator comprises at least one cyclone.

4. A method as claimed in claim 1, wherein at least one additional member selected from the group consisting of liquids, solids and gases is introduced into the fluidized bed.

5. The method of claim 1, wherein said reactor comprises
   i) a reactor jacket comprising a reactor bottom which tapers downwards,
   ii) a pipe for introducing gas into the reactor located beneath the reactor bottom and connected to a gas inlet pipe for gas introduction,
   iii) a device for discharging the reactor located beneath the reactor bottom, and
   iv) a separator,
such that an angle $\beta$ between said gas inlet pipe and the vertical is from 20 to 70°.

6. The method of claim 5, wherein a cone angle $\alpha$ measured between the reactor jacket surfaces and said conical reactor base is from 20 to 120°.

7. The method of claim 1, wherein said transition material comprises chromium or titanium.

* * * * *